United States Patent Office 3,822,113
Patented July 2, 1974

---

3,822,113
ACID DYE AND ETHYLENE OXIDE CONDENSATE OF AN N-LONG CHAIN ALKYL DIPROPYLENE TRIAMINE
John Francis Edmund Keenan, Cheadle Hulme, Thomas Ivor Jones, Poynton, and Norman Richardson, Middleton, England, assignors to Ciba-Geigy AG, Basel, Switzerland
No Drawing. Original application July 2, 1971, Ser. No. 159,460, now abandoned. Divided and this application May 18, 1973, Ser. No. 361,840
Claims priority, application Great Britain, July 9, 1970, 33,418/70
Int. Cl. D06p 5/04
U.S. Cl. 8—169                                    1 Claim

ABSTRACT OF THE DISCLOSURE

Chemical compositions are provided which are useful as surface active agents, and especially as auxiliaries more particularly as levelling agents in the dyeing of textiles. These compositions are produced by a process which comprises first cyanoethylating an alkyl amine to give an NN'-di(cyanoethyl) derivative, second hydrogenating this derivative to form an amine and third reacting this amine with ethylene oxide.

---

This is a division, of application Ser. No. 159,460, filed July 2, 1971, now abandoned.

This invention is concerned with a process for the preparation of chemical compositions, and with the use of the compositions as surface active agents, and especially as auxiliaries in the dyeing of textiles.

According to this invention, a composition is produced by a process which comprises the steps of (i) cyanoethylating a primary alkyl amine containing from 12 to 22 carbon atoms to give an NN'-di-(cyanoethyl) derivative
(ii) hydrogenating this derivative to form an amine product, and
(iii) reacting this amine product with from 45 to 200 moles of ethylene oxide per mole of product.

In general NN'-di(cyanoethyl) derivatives resulting from step (i) in this process are known compounds with the exception of that one in which the amine contains 22 carbon atoms. This compound has not previously been prepared.

Hydrogenation of an NN'-di(cyanoethyl) derivative of an amine as in step (ii) of the process will generally result in an amine product containing both primary and secondary amino groups. Products containing secondary amino groups may be cyclic or non-cyclic. Hydrogenation under carefully controlled conditions, however, for example in the presence of ammonia, will result in the formation of an essentially pure diamine

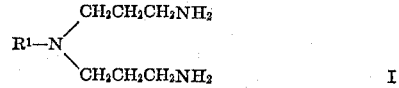

where $R^1$ is an alkyl group containing from 12 to 22 carbon atoms.

The amine product resulting from step (ii) of the process will not in general be a pure compound. However, in this specification for the purposes of calculating the amount of ethylene oxide to be used in step (iii) of the process, we assume that the amine product is in fact a pure amine of the formula I, and we calculate the number of moles present in any given weight of amine product by dividing the weight by the molecular weight of formula I.

The final composition resulting from step (iii) of the process will necessarily be a mixture of materials containing different proportions of ethylene oxide. If the starting material for stage (iii) can be envisaged as a compound of the general formula I above, then the final composition will have the average general formula:

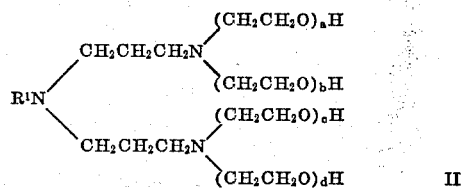

where $a+b+c+d$ is from 30 to 200. In the case where the starting material for stage (iii) is a mixture of amine products from hydrogenation of a dicyanoethyl compound, the final compositions from step (iii) will actually be a complicated mixture containing a range of ethylene oxide derivatives of primary and secondary amines.

In general, it is not possible to characterise the intermediate resulting from step (ii) nor the final composition resulting from step (iii) of the process, since these will not be pure compounds. It is possible to give each mixture of compounds an amine value, however, which gives a measure of the content of amine. The determination of amine value involves titration of the amine with perchloric acid in acetic acid to the α-naphthol benzoin end point; each mole of perchloric acid is considered as being equivalent to a mole of potassium hydroxide, and thus the basicity of the amine can be stated in terms of mg. KOH/gm. Dealing for example with step (ii) of the process, an amine value can be calculated for a pure compound of formula I; a comparison of this value with the value measured by titrating the amine product actually produced will indicate how much primary amine nitrogen has been lost, by evolution as ammonia and by formation of secondary amine.

The proportion of ethylene oxide to amine product may range from 45 to 200 moles per mole of amine. The actual proportions to be reacted will depend on the end use envisaged for the amine/ethylene oxide condensate as a surface-active agent. If the proportion of ethylene oxide is low, the solubility of the condensate in water will be low, whereas if the proportion is increased, the solubility will also be increased. All stated proportions of ethylene oxide are of course average values.

It has been found that the compositions produced according to the invention, whether the mixture of compounds produced in general, or pure compounds of the type envisaged as having formula II, are excellent levelling agents in the aqueous dyeing of textiles. For use as levelling agents, we prefer to use compositions formed by reacting from 45 to 80 moles of ethylene oxide with each mole of amine. The invention therefore includes, as an auxiliary for use in textile dyeing, an aqueous solution comprising an amine/ethylene oxide condensate prepared by our process.

It is often desirable to incorporate an antifoam agent into such an aqueous solution, to improve the properties of the dyebath to which the levelling agent is to be added. One very satisfactory type of antifoam agent is a silicone emulsion, for example the 10% aqueous silicone emulsion sold under the Trademark Irgafoamal S. In some cases, however, we have found that the addition of silicone emulsion to the aqueous solution of amine/ethylene oxide condensate results in a certain loss of stability of the solution with separation of the condensate; we can largely overcome this instability by adding to the solution a latex or solution of a polymeric carboxylic acid or of its ammonium or alkali metal salt. Surprisingly it is found that the latex or solution must be of a carboxylic acid polymer, and even then must be of a polymer of suitable molecular weight and acid group content. Latices which have been found to work well have been of styrene/maleic acid copolymer, acrylic acid/acrylate copolymer, methacrylic acid/methacrylate copolymer and carboxymethyl cellulose (as the sodium salt); solutions of methyl cellulose, hydroxyethyl cellulose and polyvinyl alcohol will not work. Latices or solutions such as we use thicken and act as dispersing agents when made alkaline, and thus may suitably be added to the solution as an ammonium salt; in some cases however it will be sufficient merely to add the latex as such, and rely on neutralisation of it by the amine/ethylene oxide condensate already present.

The final stage of our process, stage (iii), will normally be carried out in non-aqueous conditions. The ethylene oxide condensation can be carried out however in the presence of water, and the presence of ethylene glycol can then be detected in the product. From this it can be deduced that a proportion of higher glycols will also be present, and this deduction is confirmed by the surprising discovery that amine/ethylene oxide condensate prepared in this way does not require further antifoam agent to be added to it in use in a dyebath, that is to say a water/ethylene oxide reaction product is presumably present and is itself acting as an antifoam agent.

The levelling agent according to this invention is of particular value in the dyeing of natural or synthetic polyamides, specifically wool and nylon. The levelling agent may be used in conjunction with other additives conventionally used for dyeing wool and nylon, for example hexamine and citric acid.

Some Examples will now be given, all parts and proportions being by weight unless otherwise stated:

Example 1

807 g. (3 moles) of the amine sold under the trademark Kramine P18 which is essentially octadecylamine and 1614 g. of methanol were placed in a 3 necked 5 litre flask, and stirred vigorously on a water bath. 477 g. (9 moles) of acrylonitrile were added to the flask, the first third over the course of half-an-hour, the next third over the course of two hours, and the final third over the course of a further half-hour, and the reaction mixture then stirred for 16 hours at 65° C. The solvent was then distilled off, using reduced pressure over the last part of the distillation so that the temperature did not rise above 65° C.

1600 g. of methanol were then added to the flask, the mixture cooled with stirring, and the solid product filtered off and dried in a vacuum oven. 1004 g. of solid (89% yield) were obtained.

Example 2

162.5 g. (0.50 mole) of docosanylamine were dissolved in 325 g. of methanol; the solution was refluxed with vigorous stirring, and 79.5 g. (1.5 moles) of acrylonitrile were added over the course of 3 hours. The reaction mixture ws then refluxed with stirring for a further 16 hours, and then allowed to cool with stirring. The solid which precipitated was filtered off, washed with methanol and dried; 206 g. of solid were obtained having melting point 60–63° C. After recrystallisation from methanol, the melting point of the solid was observed to be 62–64° C.

Analysis of the product gave the following results:

|  | Found | Calculated for NN'-di (2-cyanoethyl) docosanylamine |
| --- | --- | --- |
| Amine value, mg. KOH/g. | 128.5 | 129.8 |
| Elemental analysis: | | |
| C, percent | 78.3 | 77.9 |
| H, percent | 12.5 | 12.4 |
| N, percent | 9.6 | 9.7 |

438 g. of N,N-di(2-cyanoethyl)-docosanylamine were melted on a steam bath and placed in a 2 litre stainless steel autoclave with 44 g. of Raney Nickel washed in with a minimum quantity of methanol. The autoclave was purged with nitrogen and pressurised with 20 atmospheres of hydrogen at 47° C., and stirred. The temperature reached 120° C. in 40 minutes and was maintained at 115–130° C. by heating after 60 minutes. Pressure was maintained at 30 atmospheres at this temperature. After 140 minutes at reaction temperature the contents of the autoclave were cooled, dissolved in methanol and filtered to remove catalyst. The methanol was distilled from the amine product giving a solid having an amine value of 310 mg. KOH/g.

The theoretical amine value of the product, assuming it to be a pure compound of formula I ($R^1=C_{22}H_{45}$) is 382.5 mg. KOH/g.

44 g. (0.1 mole) of this amine were treated with 0.75 g. of finely powdered freshly prepared sodium methoxide, heated to 140° C., and reacted with 246.3 g. (5.6 mole) of ethylene oxide over a period of 315 minutes. The amine/ethylene oxide condensate thus produced contained 56 moles of ethylene oxide per mole of amine.

13.6 parts of the polyacrylic acid/polyacrylate latex sold under the Trademark Primal ASE 60 were diluted with 85.4 parts of water, and 1 part of a 28% aqueous ammonia solution was added with stirring to give a water-white viscous 4% solution of the ammonium salt of the polymeric material. 18 parts of the amine/ethylene oxide condensate prepared above were added to 30 parts of this viscous solution, and the mixture heated to 60° C. with stirring for 15 minutes. 12 parts of hexamine were then added, over the course of 10 minutes, and the mixture stirred for a further 5 minutes at 60° C., then cooled to 30° C. and 0.3 parts of citric acid added followed by 3.0 parts of the 10% silicone emulsion sold under the Trademark Irgafoamal S. A cloudy solution was obtained, having an active ingredient content of 53% and a pH 7.6; this solution could be cooled to −40° C. and thawed at least three times without breaking down.

An aqueous dyebath of 250 ml. was prepared containing 0.8 ml. of this cloudy solution, 4 ml. of a 0.2% aqueous solution of Acid Red 114 (C.I. 23635), 4 ml. of a 0.2% aqueous solution of an azo dyestuff of the constitution 2,4-ditoluyloxy-aniline→1-hydroxy-8-toluyl-sulfonamino-naphthalene-3,6-disulphonic acid and 0.8 ml. of a 40% aqueous acetic acid solution; this was heated to 100° C. in a Smiths dyeing machine. Four 1 gm. pieces of wool flannel were wetted out by immersing them in boiling water for 2 minutes. One of the pieces was then immersed in the dyebath; the three other pieces were then subsequently immersed at 15 minute intervals, and all the pieces kept in the bath until the last one had been immersed for 45 minutes, after which they were all removed, rinsed with water and dried.

Visual assessment of the dyed pieces indicated excellent dyeings, showing that the amine/ethylene oxide condensate was an efficient levelling agent.

Example 3

The procedure described in Example 2 was repeated except that a 2% solution of the sodium carboxymethyl cellulose latex sold under the Trademark Prestofen HV was used instead of the 4% solution of the ammonium salt of Primal ASE 60.

Similar excellent dyeings were obtained.

Example 4

Octadecylamine was cyanoethylated with acrylonitrile to give NN'-di(2-cyanoethyl) octadecylamine; and this product hydrogenated to give an amine product having amine value 363.3 mg. KOH/g., following the procedures described in Example 2.

38.0 parts (0.1 mole) of this amine were heated with 0.75 parts of freshly prepared finely divided sodium methoxide to 140° C., and reacted with 216 parts (4.9 mole) of ethylene oxide, and the product obtained, containing 49 moles of ethylene oxide per mole of amine compounded and added to a dyebath as a levelling agent, again as described in Example 2.

Similar excellent dyeings were obtained.

Example 5

30 parts of the amine/ethylene oxide condensate obtained in Example 3 were reacted with a further 8.0 parts of ethylene oxide over the course of 25 minutes to give a product containing 64 moles of ethylene oxide per mole of amine. The product obtained was compounded and added to a dyebath as a levelling agent, again as described in Example 2.

Similar excellent dyeings were obtained.

Example 6

740.6 g. n-Dodecylamine (4 moles) was stirred in 1481.2 g. methanol, and heated to 60° C. The solution was treated with 636.7 g. acrylonitrile (12.0 moles) over a period of 3 hours and then reflux was continued for a further 16 hours. The solvent was distilled off giving a quantitative yield of N,N-di(2-cyanoethyl) dodecylamine m.p. 33.0–35.5° C. Amine value 188.5 mg. KOH/g. (Theory 192.2 mg. KOH/g.)

Found: C, 74.3%; H, 11.5%; N, 14.2%. Calculated: C, 74.2%; H, 11.4%; N, 14.4%.

570 g. of this N,N-di(2-cyanoethyl) dodecylamine were melted and washed into a 2 litre stainless steel autoclave with the minimum quantity of methanol and treated with 50 g. Raney Nickel. The autoclave was purged with nitrogen and pressurised with hydrogen to 20 atmospheres at 30° C. Hydrogenation was carried out at 125° C. under 30 atmospheres pressure and was complete in 2 hours, cooling being necessary for part of the time. The product was removed, and the autoclave washed out with methanol. The product and washings were filtered to remove catalyst and the methanol solvent was distilled off to give 555.5 g. of amine product of amine value 431.7 mg. KOH/g. The theoretical primary amine value of the product, assuming it to be a pure compound of formula $(R=C_{12}H_{25})$ is 560.8 mg. KOH/g.

30.0 parts of this amine product were heated with 0.75 parts of freshly prepared finely divided sodium methoxide to 140° C.; heating was then stopped and 256 parts of ethylene oxide added over the course of 315 minutes, the exothermic reaction keeping the temperature at 140° C.

The product obtained which contained 58 moles of ethylene oxide per mole of amine, was compounded and added to a dyebath as a levelling agent, again as described in Example 2.

Similar excellent dyeings were obtained.

Example 7

Octadecylamine was cyanoethylated with acrylonitrile to give NN'-di(2-cyanoethyl) octadecylamine, and this hydrogenated to give an amine product having amine value 362.0 mg. KOH/g., following the procedures described in Example 2. 38 parts of this amine product were treated with 0.75 parts of freshly prepared finely divided sodium methoxide and heated to 150° C.; at this temperature the product was reacted with 135.3 parts of ethylene oxide over the course of 4 hours to give a condensate containing 31 moles of ethylene oxide per mole of amine.

3 samples of this condensate were then treated with further amounts of ethylene oxide, in one case 36.5 parts of condensate being reacted with 33.1 parts of ethylene oxide to give a product containing 66 moles of ethylene oxide per mole of amine, in a second case 38.0 parts of condensate being reacted with 53.4 parts of ethylene oxide to give a product containing 86 moles of ethylene oxide per mole of amine, and in a third case 38.0 parts of condensate being reacted with 71 parts of ethylene oxide to give a product containing 104 moles of ethylene oxide per mole of amine.

Each of these products was compounded and added to a dyebath as a levelling agent, again as described in Example 2.

The dyeings obtained from the 66-mole condensate were excellent; those from the other two condensates were good, but not as good as those from the 66-mole condensate.

Example 8

Octadecylamine was cyanoethylated with acrylonitrile to give NN'-di-(2-cyanoethyl) octadecylamine, and this hydrogenated to give an amine product having amine value 387.2 mg. KOH/g., following the procedures described in Example 2. 38 parts of this amine product were treated with 0.75 parts of freshly prepared finely divided sodium methoxide and heated to 180° C., at this temperature the product was treated with 144.6 parts of ethylene oxide over the course of 2 hours to give a condensate containing between 33 moles of ethylene oxide per mole of amine.

36.5 parts of this condensate were then reacted with 126.6 parts of ethylene oxide at 180° C. over the course of 5 hours to give a product containing 176 moles of ethylene oxide per mole of amine.

Both these products were compounded and added to a dyebath as a levelling agent, again as described in Example 2.

The dyeings obtained were good, but not as good as those obtained in Example 2.

Example 9

10.0 parts of the amine product obtained in the course of Example 2 were stirred with 150 parts of water at 98° C., and treated with 85 parts of ethylene oxide over the course of 195 minutes. After the first 30 minutes of this time, water was distilled off, all the free water being removed by the end of the addition time. The condensate had an amine value of 40.3 mg. KOH/g. and contained 73 moles of ethylene oxide per mole of amine.

The condensate was compounded and added to a dyebath as a levelling agent, again as described in Example 2, except that the silicone antifoam was omitted. Good dyeings were obtained.

All the above Examples 2 to 9 were repeated, except using a dyebath containing 10 ml. of a 0.2% aqueous solution of a chromium complex dyestuff as described in Example 1 of U.S. Pat. 2,829,140. Visual assessment of the dyed pieces shows that the amine/ethylene oxide condensates prepared according to the invention are efficient levelling agents for this dyestuff also.

Example 10

An aqueous dyebath of 250 ml. was made up containing 0.1 g. of a chromium complex dyestuff as described in U.S. Patent 3,359,253, 0.1 ml. of 40% acetic acid, and 0.1 g. of a similar condensate/hexamine/silicone emulsion/citric acid solution to that used in Example 2, prepared from the condensate of Example 5 containing 64 moles of ethylene oxide per mole of amine.

A 10 g. sample of nylon 6.6 fabric was scoured and immersed in the dyebath at 45° C.; the temperature was then raised to 98–100° C. over the course of 30–45 minutes, and maintained at this level for a further 45 minutes. The fabric was then recovered, and rinsed in cold water; it was found to be dyed to a very level medium brown shade.

Example 11

An aqueous dyebath of 250 ml. was made up containing 0.02 g. of an anthraquinone dyestuff as described in Example 5 of U.S. Pat. 3,376,320, 0.2 ml. of 40% acetic acid and 0.1 g. of a similar condensate/hexamine/silicone emulsion/citric acid solution similar to that used in Example 2, prepared for the condensate of Example 5 containing 64 moles of ethylene oxide per mole of amine.

A 10 g. sample of nylon 6 fabric was scoured and dyed in this dye bath, using the same procedure as in Example 10. The fabric was found to be dyed to a very level pale blue shade.

What is claimed is:

1. A dyebath containing an acid dye and a proportion of an aqueous solution of a composition prepared by
   (i) cyanoethylating a primary alkyl amine containing from 12 to 22 carbon atoms to give an NN'-di-(cyanoethyl) derivative,
   (ii) hydrogenating this derivative to form an amine product, and
   (iii) reacting the amine product with from 45 to 200 moles of ethylene oxide per mole of product.

References Cited

UNITED STATES PATENTS 2,967,755   1/1961   Keller _____ 8—84

FOREIGN PATENTS 2,160   12/1966   Japan _____ 260—584 B

DONALD LEVY, Primary Examiner

U.S. Cl. X.R.

8—88, 41 B, 41 R